(12) United States Patent
O'Lenick et al.

(10) Patent No.: US 7,951,893 B2
(45) Date of Patent: May 31, 2011

(54) STAR SILICONE POLYMERS

(76) Inventors: Kevin Anthony O'Lenick, Dacula, GA (US); Anthony J. O'Lenick, Jr., Dacula, GA (US)

( * ) Notice: Subject to any disclaimer, the term of this patent is extended or adjusted under 35 U.S.C. 154(b) by 0 days.

(21) Appl. No.: 12/806,226

(22) Filed: Aug. 9, 2010

(65) Prior Publication Data

US 2010/0324251 A1    Dec. 23, 2010

Related U.S. Application Data

(62) Division of application No. 12/156,915, filed on Jun. 6, 2008, now abandoned.

(60) Provisional application No. 61/124,632, filed on Apr. 19, 2008.

(51) Int. Cl.
*C08G 77/12*    (2006.01)

(52) U.S. Cl. ............................................. 528/31; 528/25
(58) Field of Classification Search .................... 528/31, 528/25

See application file for complete search history.

(56) References Cited

U.S. PATENT DOCUMENTS

| | | |
|---|---|---|
| 5,070,171 A | 12/1991 | O'Lenick |
| 5,098,979 A | 3/1992 | O'Lenick |
| 5,136,063 A | 8/1992 | O'Lenick |
| 5,149,765 A | 9/1992 | O'Lenick |
| 5,180,843 A | 1/1993 | O'Lenick |
| 5,196,499 A | 3/1993 | O'Lenick |
| 5,227,043 A * | 7/1993 | Shakushiro et al. .......... 204/421 |

* cited by examiner

*Primary Examiner* — Kuo-Liang Peng

(57) ABSTRACT

The present invention is directed to a multifunctional organosilicone compound and the use of that compound in personal care and other applications. These compounds by virtue of their unique structure provide outstanding micro emulsions and provide outstanding skin feel.

2 Claims, No Drawings

STAR SILICONE POLYMERS

RELATED APPLICATIONS

This application is a divisional application from application Ser. No. 12/156,915, filed Jun. 6, 2008 now abandoned which in turn claims priority to and benefit of U.S. Provisional Application No. 61/124,632 filed Apr. 19, 2008, the disclosure of which is incorporated herein for all purposes.

FIELD OF THE INVENTION

The present invention is directed to a multifunctional organo-silicone compound and the use of that compound in personal care and other applications. These compounds by virtue of their unique structure provide outstanding microemulsions and provide outstanding skin feel.

BACKGROUND OF THE INVENTION

Organofunctional silicone compounds are one of two types, internal and terminal depending upon the location of the silicone group.

The so-called terminal group has the organic functional groups at the alpha and omega terminus of the molecule. Typical of this class of compounds is the class of compounds currently called bis-dimethicone conforming to the following structure:

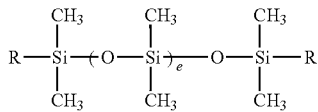

In the case where R is —(CH$_2$)$_{15}$—CH$_3$ the compound is bis cetyl dimethicone, The other type of compound is one in which the organo-functionality is located on non-terminal ends of the molecule. This type of compound is called a "comb" compound since the organofunctionality lies in the molecule much like the teeth of a comb. These compounds are shown in the following structure:

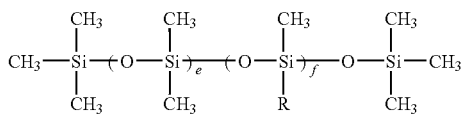

In the case where R is —(CH$_2$)$_{15}$—CH$_3$ the compound is simply cetyl dimethicone, These two classes of compounds have been known for many years. Typical patents showing these compounds and their derivatives are seen in the following patents:

There are limitations on the properties of the silicone compounds of these classes and the products are often used in different applications. The functionality of these materials is determined by the way in which they orientate in solvent. Specifically, in what conformation the lowest energy is achieved. Since oil and silicone are not soluble in each other the internal oil soluble groups rotate around the Si—O—Si bond and associate with each other in essentially spherical globules.

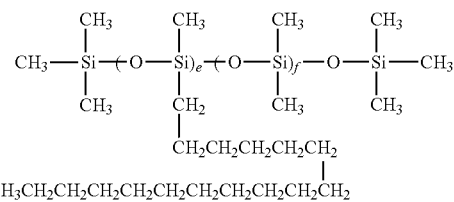

Molecule 1

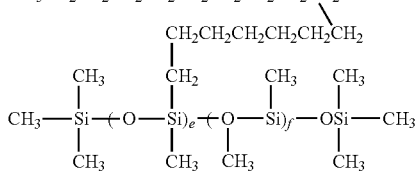

Molecule 2

The result is a sphere with silicone on the perimeter and oil soluble groups in the interior.

Now consider the terminal substituted compound. Since the organofunctional groups are fixed at the end they cannot simple rotate to associate. They form what we refer to as a sandwich type association that has the lowest energy.

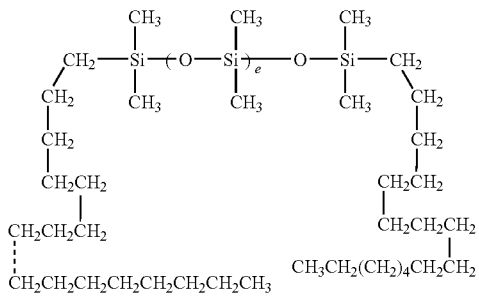

The molecular association results in a conformation that forms resembles a sandwich in which the bread is silicone rich and the "meat" is oily (i.e. alkyl groups).

Unlike either of these, we have surprisingly found that when a molecule has both terminal and comb groups present it forms different associations we refer to as star associations in which smaller aggregates form. If one considers these materials as tennis balls, the core is silicone and the yellow fuzzy coating is the oil phase. These small compact units have unexpected properties both in terms of tactile feel on the skin and the ability to make micro emulsions in water or oil, making them very valuable for use in personal care applications.

THE INVENTION

Object of the Invention

The object present invention a series of silicone star polymers and their use in personal care applications. Other objects will become clear by reading the specification.

DETAILED DESCRIPTION OF THE INVENTION

The compounds of the present invention conform to the following structure:

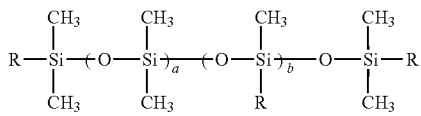

wherein:
a is an integer ranging from 0 to 200;
b is an integer ranging from 1 to 20;
R is selected from the group consisting of —(CH$_2$)$_n$—CH$_3$; —(CH$_2$)$_3$—O—(CH$_2$CH$_2$O)$_x$—(CH$_2$CH(CH$_3$)—O)$_y$H and mixtures thereof;
n is an integer ranging from 7 to 42;
x is an integer ranging from 0 to 20;
y is an integer ranging from 0 to 20.

The compounds of the present invention are prepared by the reaction of a silanic hydrogen containing silicone polymer conforming to the following structure:

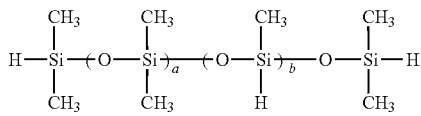

wherein:
a is an integer ranging from 0 to 200;
b is an integer ranging from 1 to 20;
and an alpha olefinic containing polymer selected from the group consisting of:

CH$_2$=CH—(CH$_2$)$_{n-2}$—CH$_3$;

CH$_2$=CH—CH$_2$—O—(CH$_2$CH$_2$O)$_x$—(CH$_2$CH(CH$_3$)—O)$_y$H and mixtures thereof;
wherein;
n is an integer ranging from 7 to 42;
x is an integer ranging from 0 to 20;
y is an integer ranging from 0 to 20.

Preferred Embodiment

In a preferred embodiment R is —(CH$_2$)$_n$—CH$_3$.
In another preferred embodiment R is —(CH$_2$)$_3$—O—(CH$_2$CH$_2$O)$_x$—(CH$_2$CH(CH$_3$)—O)$_y$H.

In another preferred embodiment R is a mixture of —(CH$_2$)$_n$—CH$_3$ and

—(CH$_2$)$_3$—O—(CH$_2$CH$_2$O)$_x$—(CH$_2$CH(CH$_3$)—O)$_y$H.

In another preferred embodiment n is 15.
In another preferred embodiment n is 17.
In another preferred embodiment x ranges from 1 to 20.
In another preferred embodiment n ranges from 5 to 15.
In another preferred embodiment a is zero.
In still another preferred embodiment a=b.
In still another embodiment a is 0, and b is 1.

EXAMPLES

Silanic Hydrogen Compounds

Silanic hydrogen compounds conform to the following structure:

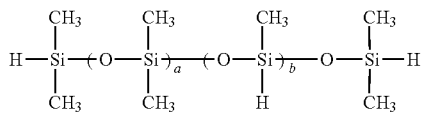

wherein:
a is an integer ranging from 0 to 200;
b is an integer ranging from 1 to 20.

They are commercially available from Siltech LLC of Dacula, Ga. The specific values reported below for the molecule were determined by Si-29 nmr.

| Example | a | b |
|---------|-----|----|
| 1 | 0 | 1 |
| 2 | 10 | 5 |
| 3 | 25 | 7 |
| 4 | 50 | 10 |
| 5 | 100 | 15 |
| 6 | 200 | 20 |

Olefinic Compounds

Alpha olefins are commercially available form a variety of sources including Chevron. They conform to the following structure:

CH$_2$=CH—(CH$_2$)$_{n-2}$—CH$_3$;

| Example | n |
|---------|----|
| 7 | 9 |
| 8 | 11 |
| 9 | 23 |
| 10 | 20 |
| 11 | 33 |
| 12 | 42 |

Allyl Alcohol Alkoxylates

Allyl alcohol alkoxylates are commercially available from several sources including Dow Chemical, Ethox Chemical, Siltech Corporation and KAO Chemical. They conform to the following structure:

CH$_2$=CH—CH$_2$—O—(CH$_2$CH$_2$O)$_x$—(CH$_2$CH(CH$_3$)—O)$_y$H

| Example | x | y |
|---------|----|----|
| 13 | 8 | 0 |
| 14 | 18 | 18 |
| 15 | 4 | 3 |
| 16 | 2 | 2 |
| 17 | 20 | 20 |

Products of the Present Invention

Alkyl Products General Procedure

The specified number of grams of alpha olefin (Examples 7-12) are added to a vessel having agitation and cooling. If the alpha olefin is solid at room temperature is added as chunks. Next the specified number of grams of silanic hydrogen (examples 1-6) is added. The batch is then heated until the alpha olefin is liquid, or 80 C whichever is lower. Next 20 ppm Karnstedt catalyst (based upon the weight of all materials to be added) is added. Cooling is added to control the exotherm. It is not uncommon for the temperature to rise from 80 C to 120 C. Hold at 120 C for 4 hours, checking the Silanic hydrogen content until it becomes vanishing small.

to control the exotherm. The two dropping funnels are adjusted so they both empty in one hour. Hold at 120 C for 4 hours, checking the Silanic hydrogen content until it becomes vanishing small. Distill off isopropanol using vacuum.

|  | Silanic Hydrogen |  | Alpha Olefin |  | Allyl alkoxylate |  | Isopropanol |
|---|---|---|---|---|---|---|---|
| Example | Example | Grams | Example | Grams | Example | Grams | Grams |
| 24 | 1 | 180 | 7 | 217 | 13 | 532 | 200 |
| 25 | 2 | 336 | 8 | 248 | 14 | 2484 | 1000 |
| 26 | 3 | 466 | 9 | 404 | 15 | 533 | 200 |
| 27 | 4 | 740 | 10 | 417 | 16 | 341 | 300 |
| 28 | 5 | 994 | 11 | 654 | 17 | 2752 | 600 |
| 29 | 6 | 1466 | 12 | 818 | 18 | 535 | 400 |

|  | Silanic Hydrogen |  | Alpha Olefin |  |
|---|---|---|---|---|
| Example | Example | Grams | Example | Grams |
| 18 | 1 | 90 | 7 | 217 |
| 19 | 2 | 168 | 8 | 248 |
| 20 | 3 | 233 | 9 | 404 |
| 21 | 4 | 370 | 10 | 417 |
| 22 | 5 | 497 | 11 | 654 |
| 23 | 6 | 733 | 12 | 818 |

Allyl Alcohol Alkoxylate Products General Procedure

The specified number of grams of allyl alcohol alkoxylates (Examples 13-17) are added to a vessel having agitation and cooling. Next the specified number of grams of silanic hydrogen (examples 1-6) is added, following by the specified number of grams of anhydrous isopropanol. The batch is then heated until the alpha olefin is liquid, or 80 C whichever is lower. Next 20 ppm Karnstedt catalyst (based upon the weight of all materials to be added) is added. Cooling is added to control the exotherm. It is not uncommon for the temperature to rise from 80° C. to 90° C. Hold at 120 C for 4 hours, checking the Silanic hydrogen content until it becomes vanishing small. Distill off isopropanol using vacuum.

|  | Silanic Hydrogen |  | Allyl alcohol alkoxylate |  | Isopropanol |
|---|---|---|---|---|---|
| Example | Example | Grams | Example | Grams | Grams |
| 24 | 1 | 90 | 13 | 532 | 200 |
| 25 | 2 | 168 | 14 | 2484 | 1000 |
| 26 | 3 | 233 | 15 | 533 | 200 |
| 27 | 4 | 370 | 16 | 341 | 300 |
| 28 | 5 | 497 | 17 | 2752 | 600 |
| 29 | 6 | 733 | 18 | 535 | 400 |

Mixed Alpha Olefin/Allyl Alcohol Alkoxylate Products General Procedure

The specified number of grams of silanic hydrogen compound (Example 1-6) is added to a vessel with mixing, cooling, and two dropping funnels. The specified number of grams of isopropanol is then added. 20 ppm Karnstedt catalyst (based upon the weight of all materials to be added) is added. The reaction mass is heated to 80 C and the specified number of grams of the specified allyl alcohol alkoxylates (Examples 13-17) is added to the vessel from one dropping funnel while simultaneously the specified number of grams of alpha olefin is added from the other funnel. Cooling is added Application Examples

| Example | Appearance |
|---|---|
| 18 | Clear liquid with an outstanding dry skin feel. |
| 19 | Clear liquid with some cushion and outstanding feel |
| 20 | Intermediate hardness solid. Easily spread outstanding lotion additive. |
| 21 | Intermediate hardness. |
| 22 | Hard wax but yields well under pressure |
| 23 | Hard solid white wax with exceptional skin drag. Useful in stick products. |
| 24 | Water soluble with an outstanding slip and conditioning. |
| 25 | Water soluble material with outstanding wet comb when applied to hair. |
| 26 | Water soluble product. Provides outstanding feel in antiperspirant applications. |
| 27 | Micro emulsion. Outstanding lubricant in water. |
| 28 | Micro emulsion. |
| 29 | Water soluble solid white wax with exceptional emolliency |

Examples 30-35 are emulsifiers suitable for making water in oil and oil in water emulsions.

The outstanding skin feel, hair lubrication and emulsification observed in evaluating the compounds of the present invention make them well suited for personal care applications.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:
1. A silicone polymer conform to the following structure:

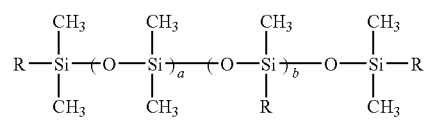

wherein:
a is an integer ranging from 0 to 200;
b is an integer ranging from 1 to 20;
with the proviso a=b;
R is

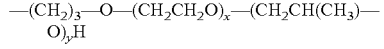

x is an integer ranging from 0 to 20;
y is an integer ranging from 0 to 20.

2. A silicone polymer prepared by the reaction of a silanic hydrogen containing silicone polymer conforming to the following structure:

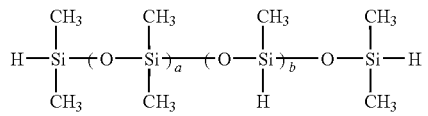

wherein:
a is an integer ranging from 0 to 200;
b is an integer ranging from 1 to 20;
with the proviso a=b;
and

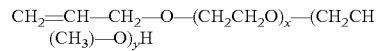

wherein;
x is an integer ranging from 0 to 20;
y is an integer ranging from 0 to 20.

* * * * *